(12) United States Patent
Western

(10) Patent No.: X5761
(45) Date of Patent: Dec. 23, 1829

(54) TIDE POWER

(76) Inventor: Henry M. Western

United States Patent
Patent No.: X5761
5761X
*H. M. Western.*
*Tide Power.*
*Patented Dec. 23, 1829.*
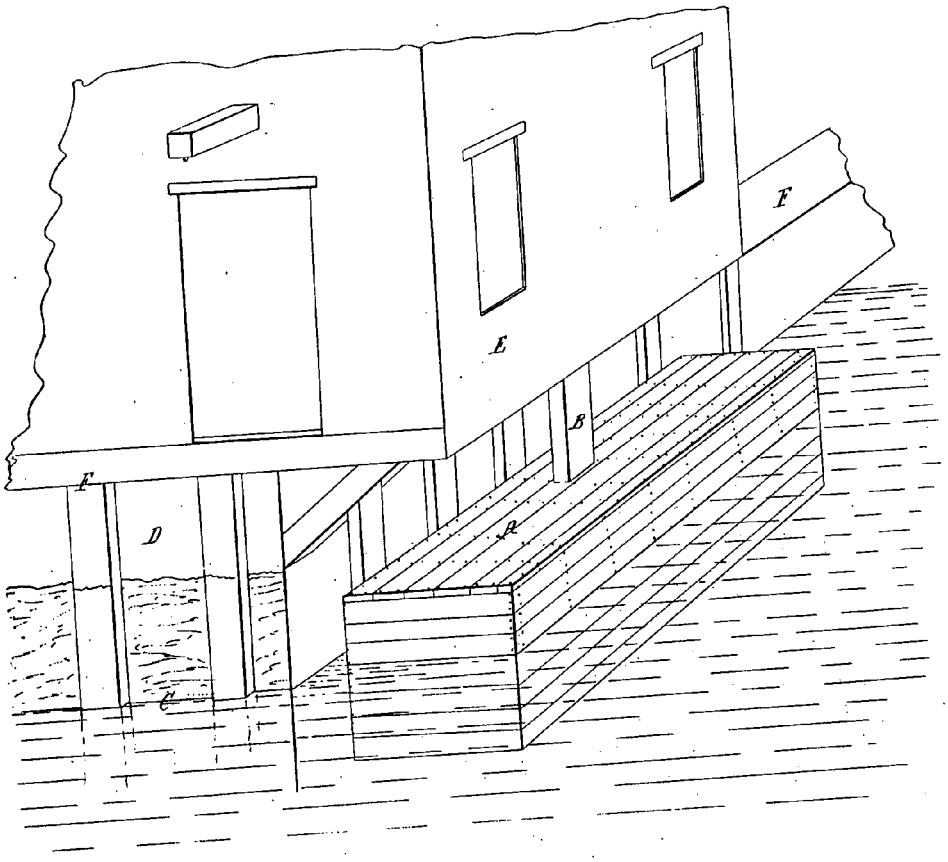
N. PETERS, PHOTO-LITHOGRAPHER, WASHINGTON, D. C.